(12) United States Patent
Rowe et al.

(10) Patent No.: US 11,181,606 B1
(45) Date of Patent: Nov. 23, 2021

(54) POINTING SYSTEM FOR MANUAL TELESCOPE

(71) Applicant: Celestron Acquisition, LLC, Torrance, CA (US)

(72) Inventors: David Rowe, Palos Verdes Estates, CA (US); Danyal Medley, Lakewood, CA (US); Eric J. Kopit, Redondo Beach, CA (US); Tim DeBenedictis, San Francisco, CA (US)

(73) Assignee: Celestron Acquisition, LLC, Torrance, CA (US)

( * ) Notice: Subject to any disclaimer, the term of this patent is extended or adjusted under 35 U.S.C. 154(b) by 0 days.

(21) Appl. No.: 15/919,094

(22) Filed: Mar. 12, 2018

Related U.S. Application Data

(60) Provisional application No. 62/470,822, filed on Mar. 13, 2017.

(51) Int. Cl.
| | | |
|---|---|---|
| *G02B 23/00* | (2006.01) |
| *G01S 3/786* | (2006.01) |
| *G02B 25/00* | (2006.01) |
| *G02B 23/10* | (2006.01) |
| *G06T 7/73* | (2017.01) |

(52) U.S. Cl.
CPC .......... *G01S 3/7865* (2013.01); *G02B 23/105* (2013.01); *G02B 25/001* (2013.01); *G06T 7/74* (2017.01)

(58) Field of Classification Search
CPC ........ G02B 23/00; G02B 23/12; G02B 23/16; G01S 3/7865
USPC ......................................... 359/399, 409, 430
See application file for complete search history.

(56) References Cited

U.S. PATENT DOCUMENTS

| | | |
|---|---|---|
| 2,967,456 A | 1/1961 | Maier |
| D268,786 S | 4/1983 | Galindo |
| 5,133,050 A | 7/1992 | George et al. |
| 5,223,702 A | 6/1993 | Conley |
| 5,243,351 A | 9/1993 | Rafanelli et al. |

(Continued)

FOREIGN PATENT DOCUMENTS

| | | |
|---|---|---|
| CN | 203365797 U | 12/2013 |
| EP | 785453 | 10/2001 |

(Continued)

OTHER PUBLICATIONS

A Sky Full of Stars, "Plate Solving", May 16, 2009, pp. 1-6 (retrieved on Mar. 29, 2011 from http://blog.askyfullofstars.com/tag/plate-solving/).

(Continued)

*Primary Examiner* — Thong Q Nguyen
(74) *Attorney, Agent, or Firm* — Raubvogel Law Office

(57) ABSTRACT

An optical device such as a telescope may be oriented to view a subject. In one embodiment, an image capture device may be coupled to the optical device, and used to generate image data of a reference subject. The image data may be used to ascertain a first orientation of the optical device. A second orientation of the optical device, at which the subject is viewable using the optical device, may be ascertained. A rotation of the optical device needed to reorient the optical device from the first orientation to the second orientation may be calculated. Instructions may be outputted to the user, indicating how the user can apply the rotation to the optical device.

26 Claims, 8 Drawing Sheets

(56) References Cited

U.S. PATENT DOCUMENTS

| | | |
|---|---|---|
| 5,335,190 A | 8/1994 | Nagle et al. |
| 5,525,793 A | 6/1996 | Holmes et al. |
| D390,583 S | 2/1998 | Diebel et al. |
| D392,657 S | 3/1998 | Diebel et al. |
| 5,745,869 A | 4/1998 | van Bezooijen |
| D412,920 S | 8/1999 | Diebel et al. |
| 5,935,195 A | 8/1999 | Quine |
| D417,680 S | 12/1999 | Diebel et al. |
| D417,881 S | 12/1999 | Diebel et al. |
| D422,610 S | 4/2000 | Diebel et al. |
| 6,266,616 B1 | 7/2001 | Needelman |
| 6,304,376 B1 | 10/2001 | Baun et al. |
| 6,369,942 B1 | 4/2002 | Hedrick et al. |
| 6,392,799 B1 | 5/2002 | Baun et al. |
| 6,445,498 B1 | 9/2002 | Baun et al. |
| 6,563,636 B1 | 5/2003 | Baun et al. |
| 6,603,602 B1 | 8/2003 | McWilliams |
| D492,334 S | 6/2004 | Hines et al. |
| D496,672 S | 9/2004 | Hines et al. |
| D496,673 S | 9/2004 | Hines et al. |
| D502,201 S | 2/2005 | Hines et al. |
| D502,481 S | 3/2005 | Hines et al. |
| 6,972,902 B1 | 12/2005 | Chen et al. |
| 7,046,438 B2 | 5/2006 | McWilliams |
| 7,194,146 B2 | 3/2007 | BenDaniel et al. |
| 7,313,763 B1 | 12/2007 | Bisque et al. |
| 7,339,731 B2 | 3/2008 | Baun et al. |
| 7,349,804 B2 | 3/2008 | Belenkii et al. |
| 7,382,448 B1 | 6/2008 | Hedrick et al. |
| 7,526,100 B1 | 4/2009 | Hartman et al. |
| 7,661,221 B2 * | 2/2010 | Holmberg ............ F41G 11/003 396/419 |
| 8,279,522 B2 | 10/2012 | Fujimoto et al. |
| 8,401,307 B1 | 3/2013 | Rowe et al. |
| 8,477,419 B1 | 7/2013 | Medley |
| 8,690,460 B2 * | 4/2014 | Kuehl .................... G02B 7/02 396/428 |
| 9,632,305 B2 | 4/2017 | Peters et al. |
| 10,795,146 B2 * | 10/2020 | Garrison ................ H04M 1/04 |
| 2002/0171924 A1 | 11/2002 | Varner et al. |
| 2003/0086150 A1 | 5/2003 | Moon et al. |
| 2003/0156324 A1 | 8/2003 | Baun et al. |
| 2003/0197930 A1 | 10/2003 | Baun et al. |
| 2003/0202682 A1 | 10/2003 | Yanagisawa et al. |
| 2004/0047036 A1 | 3/2004 | Baun et al. |
| 2004/0233521 A1 | 11/2004 | McWilliams |
| 2005/0168811 A1 * | 8/2005 | Mattei .................. G02B 23/16 359/389 |
| 2005/0225854 A1 | 10/2005 | McWilliams |
| 2006/0001956 A1 | 1/2006 | Baun et al. |
| 2006/0018012 A1 | 1/2006 | Smith et al. |
| 2006/0028720 A1 | 2/2006 | Harrelson |
| 2006/0103926 A1 | 5/2006 | Meyers et al. |
| 2006/0158722 A1 | 7/2006 | Fujimoto et al. |
| 2006/0238860 A1 | 10/2006 | Baun et al. |
| 2006/0284495 A1 | 12/2006 | Seo et al. |
| 2007/0115545 A1 | 5/2007 | Chen et al. |
| 2007/0183031 A1 | 8/2007 | Xu et al. |
| 2008/0018995 A1 | 1/2008 | Baun |
| 2008/0163504 A1 | 7/2008 | Smith et al. |
| 2008/0168492 A1 | 7/2008 | Baun et al. |
| 2008/0174863 A1 | 7/2008 | Whorton |
| 2009/0195871 A1 | 8/2009 | McWilliams |
| 2010/0065452 A1 | 3/2010 | Ottl |
| 2010/0085638 A1 | 4/2010 | Lopresti |
| 2010/0103251 A1 | 4/2010 | Numako |
| 2012/0320340 A1 | 12/2012 | Coleman, III |
| 2013/0016963 A1 | 1/2013 | Miller |
| 2013/0331148 A1 | 12/2013 | Brough |
| 2014/0376903 A1 | 12/2014 | Garber |
| 2015/0054935 A1 | 2/2015 | Muramatsu |
| 2016/0116731 A1 | 4/2016 | Peters et al. |
| 2016/0191820 A1 * | 6/2016 | Iwasaki ............ H04N 5/35536 348/169 |

FOREIGN PATENT DOCUMENTS

| | | |
|---|---|---|
| WO | 2004049033 | 6/2004 |
| WO | 2009057163 | 5/2009 |

OTHER PUBLICATIONS

Plate Solving, Pointing Correction & Auto Mapping (A laymen's explanation), Apr. 7, 2009. Retrieved from the Internet: URL:http://www.jatobservatory.org/remote_control/platesolve.html.

Carpenter et al., "Searching the Sky with CONFIGR-STARS", 2010, Technical Report CAS/CNS TR-2009-013, Neural Networks, pp. 1-23.

Bruccoleri, Christian, et al., "Toward Ground-Based Autonomous Telescope Attitude Estimation Using Real Time Star Pattern Recognition", Texas A&M University, 2004, pp. 1-12.

Roweis, Sam, et al., "Making the Sky Searchable: Fast Geometric Hashing for Automated Astrometry", Center for Cosmology and Particle Physics, University of Toronto, pp. 1-49, 2006.

Dong, Ying, et al., "Brightness Independent 4-Star Matching Algorithm for Lost-in-Space 3-Axis Attitude Acquisition", Tsinghua Science and Technology, ISSN 1007-0214 08/18 pp. 543-548, vol. 11, No. 5, Oct. 2006.

Harvey, Chris, "New Algorithms for Automated Astrometry", University of Toronto, 2004, p. 1-93.

Hogg, David W., et al., "Automated Astrometry", Astronomical Data Analysis Software and Systems XVII, ASP Conference Series, vol. 394, 2008, pp. 27-34.

Samaan, Malak A., et al., "Nondimensional Star Identification for Uncalibrated Star Cameras", The Journal of the Astronautical Sciences, vol. 54, No. 1, Jan.-Mar. 2006, pp. 1-17.

Lang, Dustin, et al., "Blind astrometric calibration of arbitrary astronomical images", Astrometry.net, Oct. 12, 2009, pp. 1-55.

Mortari, Daniele, et al., "The Pyramid Star Identification Technique", Texas A&M University, College Station, Texas, pp. 1-21, 2014.

Cole, Gary M., "Automating a Telescope for Spectroscopy", The Society for Astronomical Sciences 27th Annual Symposium on Telescope Science, 2008, pp. 103-108.

Edgar, James, "The Saskatchewan Millennium Telescope", Journal of the Royal Astronomical Society of Canada, Jun. 2002, pp. 91-95.

Gerszewski, Michael T., "The hardware and software design of the asteroid and comet Internet telescope", University of North Dakota, 2002, pp. 1-112.

Kubanek, Petr, "RTS2—The Remote Telescope System", Hindawi Publishing Corporation, Advances in Astronomy, vol. 2010, Jan. 29, 2010, pp. 1-9.

ACP Observatory Control Software, "DC-3 Dreams, SP", http://acp.dc3.com/index2.html, 2006 (retrieved on Mar. 29, 2011).

* cited by examiner

POINTING SYSTEM FOR MANUAL TELESCOPE

CROSS-REFERENCE TO RELATED APPLICATIONS

The present application claims the benefit of U.S. Provisional Application Ser. No. 62/470,822 for "POINTING SYSTEM FOR MANUAL TELESCOPE", filed on Mar. 13, 2017, the disclosure of which is incorporated herein by reference in its entirety.

The present application is related to U.S. patent application Ser. No. 12/983,065 for "DETERMINING CELESTIAL COORDINATES FOR AN IMAGE", filed on Dec. 31, 2010 and issued on Mar. 19, 2013 as U.S. Pat. No. 8,401,307, the disclosure of which is incorporated herein by reference in its entirety.

The present application is also related to U.S. patent application Ser. No. 14/882,814 for "LENS CAP ADAPTER FOR IMAGE CAPTURE DEVICE", filed on Oct. 14, 2015 and issued on Apr. 25, 2017 as U.S. Pat. No. 9,632,305, the disclosure of which is incorporated herein by reference in its entirety.

TECHNICAL FIELD

The present document relates to systems and methods for aiming optical devices, such as telescopes, at subjects to be viewed, such as celestial bodies.

BACKGROUND

Many people enjoy viewing objects through optical devices such as telescopes, binoculars, and the like. Such optical devices can make it possible to view distant objects as though they were much closer to the user's position. Telescopes have grown popular for observing celestial objects and phenomena.

It can be difficult and time-consuming to properly align an optical device with a subject of interest, such as a celestial body. The naked eye often cannot detect or recognize the subject, and the field-of-view of the optical device may be so small that it is very difficult to locate the subject through the optical device. In addition, most people do not know where to look in the sky for objects of interest to view.

Some optical devices are equipped with systems that help automate orientation of the optical device. However, such systems add significantly to the cost, weight, and complexity of the optical device. Hence, many users continue to rely on manual orientation techniques, and therefore have to deal with the difficulties referenced above.

SUMMARY

The present document describes systems and methods that can be used to guide orientation of an optical device through the use of an image capture device, such as a smartphone, tablet, and/or the like. In at least one embodiment, a method for orienting an optical device to view a subject may include coupling an image capture device to the optical device and, with the image capture device, generating image data of a reference subject. The method may further include, at a processor, using the image data to ascertain a first orientation of the optical device, ascertaining a second orientation of the optical device, at which the subject is viewable using the optical device, calculating a rotation of the optical device needed to reorient the optical device from the first orientation to the second orientation, and using the rotation to guide motion of the optical device from the first orientation to the second orientation. In at least one embodiment, the system may continue to iterate through the steps of ascertaining the first orientation, calculating the rotation, and guiding motion toward the second orientation, until the second orientation has been reached and the subject object is in view of the optical device.

Coupling the image capture device to the optical device may include coupling a coupling device to the optical device, and coupling the image capture device to the coupling device.

The coupling device may include an optical element. Generating the image data may include, in the image capture device, receiving light from within a field-of-view in which the optical element is positioned.

At least one of coupling the coupling device to the optical device and coupling the image capture device to the coupling device may include providing an adjustable orientation of the image capture device relative to the optical device. The method may further include, after coupling the coupling device to the optical device and coupling the image capture device to the coupling device, and prior to generating the image data, adjusting an orientation at which the image capture device is coupled relative to the optical device. In at least one embodiment, the user may have the ability to reorient the image capture device relative to the optical device, as long as the optical device field-of-view is somewhere within the camera's field of view.

The coupling device may include an image capture device holder, or "holder." Coupling the image capture device to the coupling device may include inserting the image capture device into the holder.

The coupling device may include an attachment block. Coupling the image capture device to the coupling device may include attaching the image capture device to an exterior surface of the attachment block.

The image capture device may have a display screen. The coupling device may have a mirrored surface positioned in an optical pathway along which the display screen is viewable by a user.

The coupling device may have a mirrored surface positioned in an optical pathway along which light is received by the image capture device. Generating the image data may include capturing light reflected by the mirrored surface.

The coupling device may have a lens. Generating the image data may include capturing light through the lens.

Using the image data to ascertain a first orientation of the optical device may include comparing the image data with stored information regarding known celestial objects to identify one or more celestial objects appearing in the image data.

The method may further include, at an input device, receiving user input identifying the subject. Ascertaining the second orientation of the optical device may include identifying the subject within stored information regarding known celestial objects to obtain a location of the subject.

The method may further include obtaining an angular offset between fields-of-view of the optical device and the image capture device. Using the image data to ascertain the first orientation may further include using the angular offset.

Using the rotation to guide motion of the optical device from the first orientation to the second orientation may include outputting instructions to a user, indicating how the user can apply the rotation to the optical device. For example, where the image capture device is a smartphone with a display screen, arrows may be displayed on the display screen to indicate whether the user needs to rotate the optical device upward, downward, to the right, and/or to the left.

After some rotation has been carried out, a determination may be made as to whether the optical device is properly oriented toward the subject object, i.e., whether the subject object is within the field-of-view of the optical device. If the optical device is not yet properly oriented, the image capture device may determine how much additional rotation is needed. This may optionally be done through the use of sensors incorporated into the smartphone, such as a compass, an accelerometer, and/or a gyroscope. Additionally or alternatively, the image capture device may capture a new image and repeat the process of comparison of the image data with a database of celestial bodies to determine the necessary rotation(s) to bring the subject object into the optical device field-of-view. This process may be repeated until the optical device is properly aligned with the subject object.

The image capture device may be a smartphone. Using the image data to ascertain a first orientation of the optical device may include using the image data in combination with one or more data elements provided by the smartphone, selected from the group consisting of date data, time data, location data, compass data, accelerometer data, and gyroscope data.

According to one embodiment, a non-transitory computer-readable medium for orienting an optical device to view a subject may have instructions stored thereon, that when performed by a processor, perform the steps of causing an image capture device, coupled to the optical device, to generate image data of a reference subject, using the image data to ascertain a first orientation of the optical device, ascertaining a second orientation of the optical device, at which the subject is viewable using the optical device, calculating a rotation of the optical device needed to reorient the optical device from the first orientation to the second orientation, and using the rotation to guide motion of the optical device from the first orientation to the second orientation.

After some rotation of the optical device has occurred, a determination may be made as to whether the optical device is properly oriented toward the subject object, i.e., whether the subject object is within the field-of-view of the optical device. If the optical device is not yet properly oriented, the image capture device may determine how much additional rotation is needed, as mentioned above, via sensors in the optical device and/or further optical comparison with additional captured imagery. This process may be repeated until the optical device is properly aligned with the subject object.

Using the image data to ascertain a first orientation of the optical device may include comparing the image data with stored information regarding known celestial objects to identify one or more celestial objects appearing in the image data.

The non-transitory computer-readable medium may further have instructions stored thereon, that when executed by a processor, cause an input device to receive user input identifying the subject. Ascertaining the second orientation of the optical device may include identifying the subject within stored information regarding known celestial objects to obtain a location of the subject.

The non-transitory computer-readable medium may further have instructions stored therein, that when executed by a processor, obtain an angular offset between fields-of-view of the optical device and the image capture device. Using the image data to ascertain the first orientation may further include using the angular offset.

Using the rotation to guide motion of the optical device from the first orientation to the second orientation may include causing an output device to output instructions to a user, indicating how the user can apply the rotation to the optical device.

The image capture device may be a smartphone. Using the image data to ascertain a first orientation of the optical device may include using the image data in combination with one or more data elements provided by the smartphone, selected from the group consisting of date data, time data, location data, compass data, accelerometer data, and gyroscope data.

According to one embodiment, a coupling device for facilitating orientation an optical device to view a subject may include an optical device mounting feature configured to mount the coupling device to the optical device, and an image capture device mounting feature configured to mount an image capture device to the coupling device, with the image capture device in an orientation at which the image capture device is able to generate image data of a reference subject that is not within an optical device field-of-view of the optical device. Conversely, in some embodiments, the angular offset between the image capture device and the optical device may be sufficiently small that some or all of the optical device field-of-view is contained within the field-of-view of the image capture device.

The coupling device may include an optical element. The image capture device mounting feature may further be configured to mount the image capture device to the coupling device such that the optical element is within an image capture device field-of-view of the image capture device.

At least one of the optical device mounting feature and the image capture device mounting feature may be configured to provide an adjustable orientation of the image capture device relative to the optical device, provided the optical device field-of-view is somewhere within the camera's field of view.

The coupling device may include a holder within which the image capture device mounting feature is positioned.

The image capture device mounting feature may include an attachment block with an exterior surface to which the image capture device is attachable.

The image capture device may have a display screen. The coupling device may have a mirrored surface positioned in an optical pathway along which the display screen is viewable by a user with the image capture device mounted to the image capture device mounting feature.

The coupling device may have a mirrored surface positioned in an image capture device field-of-view of the image capture device with the image capture device mounted to the image capture device mounting feature.

The coupling device may have a lens positioned in an image capture device field-of-view of the image capture device with the image capture device mounted to the image capture device mounting feature.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

According to various embodiments, a telescope system may be designed to permit attachment and positioning of a camera outside the telescope housing. This may facilitate image capture, and allow the telescope to be used with a variety of digital imaging systems. The manner in which this is accomplished will be shown and described subsequently.
Exemplary Telescope System Configuration Referring to FIG. 1, a side elevation view depicts an optical device in the form of a telescope system 100, according to one embodiment. In this application, an "optical device" may be any device that is designed to direct, capture, or otherwise manipulate light for viewing by a user. Thus, optical devices may include telescopes, binoculars, periscopes, cameras, lens attachments, and/or any other device that utilizes lenses, mirrors, and/or prisms to manipulate light. One exemplary optical device in the form of a telescope is sold by Applicant under the name of AstroMaster 90 EQ®.

Figure 1:
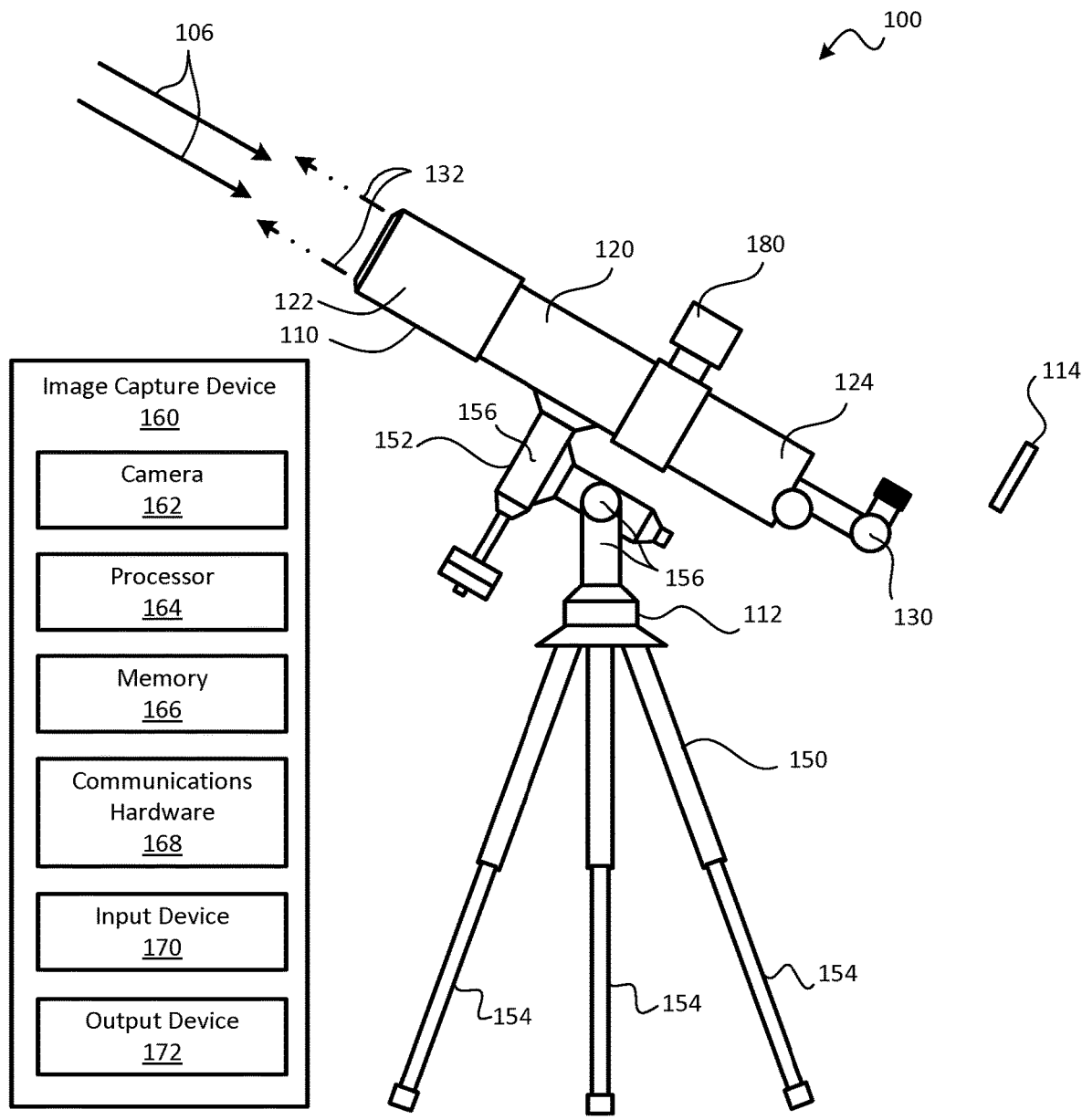
FIG. 1 is a side elevation view of an optical device in the form of a telescope system, according to one embodiment.

The telescope system 100 of FIG. 1, which is merely exemplary, may be of a type suitable for viewing and/or photographing subjects such as celestial bodies, or may be used for Earth-bound scientific observations or other purposes. The telescope system 100 may receive light 106, which may be extra-terrestrial light, and/or light from any other source, and may be used to provide the user with a view of the subject.

As shown, the telescope system 100 may include multiple exemplary components. Such components may include, but need not be limited to, a telescope 110, a support 112, and a camera 114. The telescope 110 may be used to view far-away objects, such as extra-terrestrial objects. The telescope 110 may be supported by the support 112 at an orientation suitable for viewing and/or photographing the subject. The support 112 may facilitate orientation of the telescope 110 at the subject. In some embodiments, the support 112 may provide two-axis adjustment (for example, azimuth and elevation) of the orientation of the telescope 110.

The camera 114 may optionally be coupled to the telescope 110 to capture a view of the subject, as provided by the telescope 110. Optionally, the camera 114 may be used to capture images of such extra-terrestrial subject matter, through the capture of light received by the telescope 110. In effect, the telescope 110 may act as a lens system for the camera 114. The camera 114 may be secured to the telescope 110 through the use of the adapter set forth in U.S. application Ser. No. 14/882,814, referenced above.

As shown, the telescope 110 may have a housing 120, which may have a generally tubular shape as shown, or in alternative embodiments, another suitable shape such as a square or rectangular cross-sectional shape. The housing 120 may be sized to provide the desired aperture size so that the telescope 110 can capture sufficient light to generate bright, clear images with little vignetting, within a relatively short exposure period.

The housing 120 may have an aperture end 122 and a viewing end 124. The aperture end 122 may be oriented toward the subject matter to be viewed and/or imaged. Proximate the viewing end 124, the telescope 110 may have an eyepiece 130 coupled to the viewing end 124 of the housing 120. The eyepiece 130 may be designed such that an image of the light 106 captured by the telescope 110 is focused at the eyepiece 130. Thus, the user may view and/or capture the image through the eyepiece 130. The telescope 110 may have a field-of-view 132.

The support 112 may have a base portion 150 and a telescope mounting portion 152. The base portion 150 may provide stable support for the telescope mounting portion 152, and thence, for the telescope 110. Thus, the base portion 150 may have multiple legs 154 that provide such stability. If desired, the legs 154 may be arranged to define a tripod or other known support structure. The telescope mounting portion 152 may have one or more joints 156 that can be adjusted to adjust the orientation of the telescope 110 relative to the support 112. The telescope mounting portion 152 may have one or more mounting features that mate with and/or are otherwise secured to the telescope 110, for example, via attachment to an accessory mount (not shown) or other support attachment feature of the telescope 110.

The joints 156 may be user-adjustable in a variety of ways. According to some embodiments, the joints 156 may be manually adjusted and fixed in their respective desired orientations with set screws or other fixation devices. In other embodiments, the joints 156 may be motor-driven. Stepper motors or other motors that provide fine control and locking capability may be used. Such motors may, if desired, be electronically controlled.

In some embodiments, the joints 156 lack any feature that moves them automatically to orient the telescope 110. Typical examples of the base portion 150 include non-computerized alt-azimuth and equatorial mounts, although any other type of mount can be used. Such mounts may require that the user manually orient the telescope 110 at the desired subject. In some embodiments, the camera 114 may have computing functionality that enables the camera 114 to perform the orientation assistance functions that will be outlined below. For example, the camera 114 may be a smartphone, tablet, or the like, and may be capable of running an app that facilitates orientation of the telescope 110, in addition to capturing image data through the telescope 110.

In alternative embodiments, an image capture device 160 that is separate from the camera 114 may be used, or the camera 114 may be omitted. The image capture device 160 may be a smartphone, tablet, or the like, and may have a camera 162, a processor 164, memory 166, communications hardware 168, and/or other electronics that enable the image capture device 160 to run an app that facilitates orientation of the telescope 110 through the use of images captured by the camera 162. The image capture device 160 may also have an input device 170 and an output device 172 designed to receive input from and provide output, respectively, to a user. In some embodiments, the input device 170 and the output device 172 may be integrated, for example, in the form of a touch screen.

The image capture device 160 may advantageously be coupled to the telescope 110 to facilitate alignment of the telescope 110 with the image capture device 160. Accordingly, the telescope system 100 may also have a coupling device 180 that can be used to couple the image capture device 160 to the telescope 110. The coupling device 180 will be shown and described in greater detail below, with reference to FIG. 2.

Exemplary Coupling Devices

Figure 2:
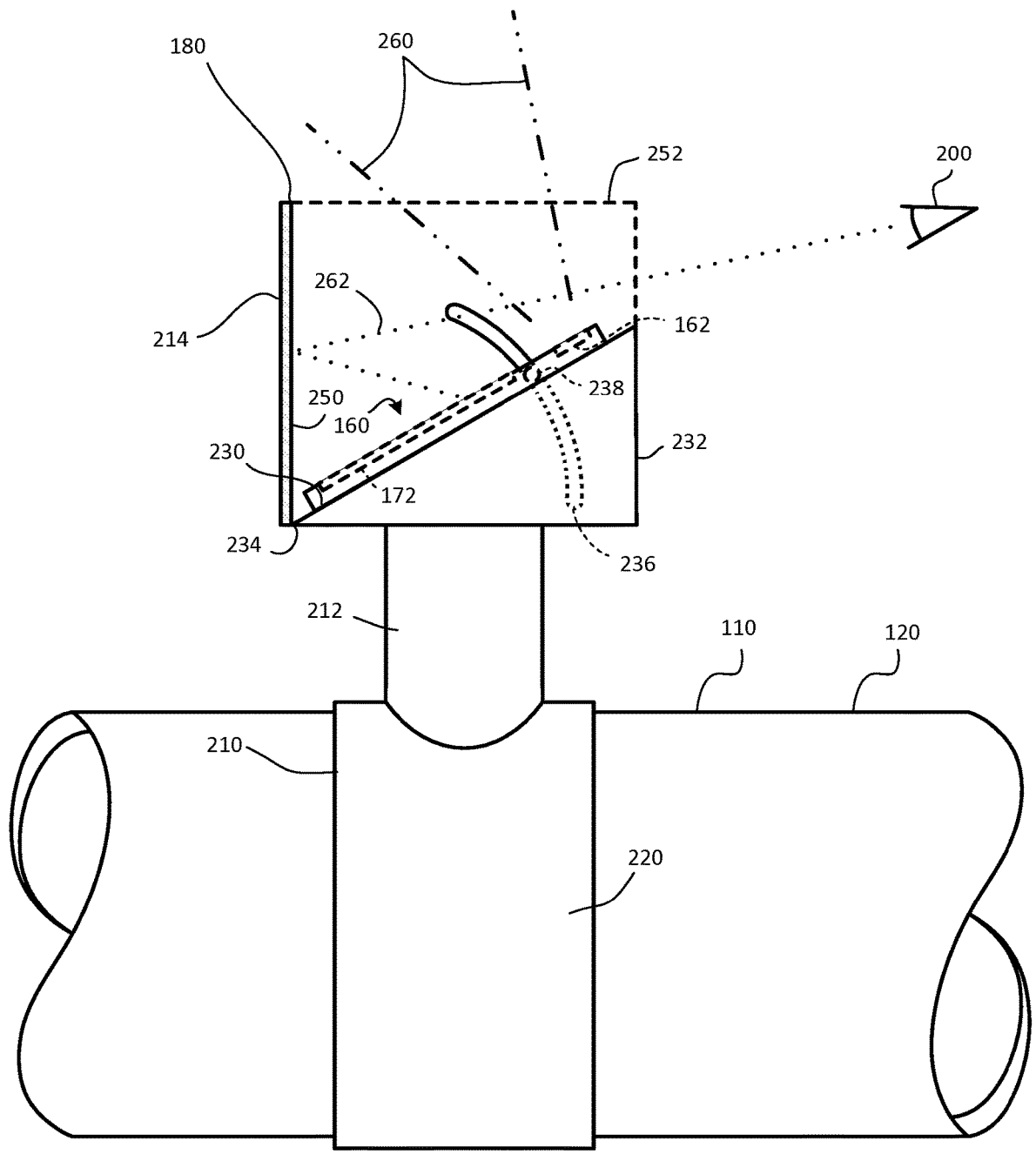
FIG. 2 is a side elevation view of a portion of the telescope of FIG. 1, with the image capture device coupled to the housing through the use of the coupling device.

Referring to FIG. 2, a side elevation view depicts a portion of the telescope 110, with the image capture device 160 coupled to the housing 120 through the use of the coupling device 180 of FIG. 1. As shown, the coupling device 180 may position the image capture device 160 above the housing 120, at a position at which a user (represented by the eye 200) can readily view the image capture device 160 without moving his or her eye far from the eyepiece 130 (not shown in FIG. 2) of the telescope 110. Thus, the user may readily be able to switch between viewing the guidance provided by the image capture device 160 and viewing the view provided by the telescope 110, as he or she orients the telescope 110 at the desired subject. However, positioning the image capture device 160 above the telescope 110 is merely exemplary; in some embodiments, the image capture device 160 may be positioned above, to the side of, proximal to, and/or (depending on the structure of the base portion 150), beneath the telescope 110. Any combination of the foregoing locations is contemplated within the scope of the present disclosure.

As shown, the coupling device 180 may have an optical device mounting feature 210, an extension arm 212, and a holder 214. The optical device mounting feature 210 may mount the coupling device 180 to the telescope 110. The extension arm 212 may position the holder 214 at a desired offset (in the case of FIG. 2, vertically) from the housing 120. The holder 214 may contain the image capture device 160 and facilitate user viewing of data from the image capture device 160, while positioning the image capture device 160 to capture an image that can be used to determine the initial orientation of the telescope 110. The holder 214 may be constructed of any suitable material such as plastic, cardboard, metal, wood, or the like.

An optical device mounting feature may be configured in various ways; in the example of FIG. 2, the optical device mounting feature 210 includes a collar 220. The collar 220 may have an interior diameter sized to receive the exterior of the housing 120 with sufficiently tight engagement to keep the coupling device 180 substantially stationary relative to the housing 120. The collar 220 may be divided into two halves that can be secured together around the housing 120, or may otherwise be expanded or disassembled to facilitate attachment of the collar 220 to the housing 120 and/or removal of the collar 220 from the housing 120.

In some embodiments, an optical device mounting feature and/or an extension arm may provide an adjustable mounting. For example, in some embodiments, the extension arm 212 may include one or more pivot joints that pivotably couple the extension arm 212 to the optical device mounting feature 210 and/or the holder 214. Locking features such as clips, clamps, and/or the like may be used to lock the holder 214 in position relative to the optical device mounting feature 210. Such pivot joints and/or locking features may enable the user to adjust the orientation of the holder 214 relative to the telescope 110. However, this is optional; in other embodiments, as in FIG. 2, it may be desirable to provide a relatively rigid connection between the holder 214 and the optical device mounting feature 210.

In some embodiments, the orientation of the image capture device 160 relative to the telescope 110 may be adjustable, but only to an extent that some or all of the field-of-view 132 of the telescope 110 remains within the field-of-view of the image capture device 160. Having some or all of the field-of-view 132 of the telescope 110 within the field-of-view of the image capture device 160 may enable the plate solving algorithm to determine the angular offset between the image capture device 160 and the telescope 110, thus avoiding the need for the user to measure and enter the offset into the image capture device 160.

The holder 214 may contain and/or otherwise retain the image capture device 160 in an orientation that can be kept constant relative to that of the telescope 110 such that reorientation of the image capture device 160 also reorients the telescope 110 in the same manner. This may be done in a variety of ways. According to some examples, the image capture device 160 may rest on an angled plate 230 that resides within the holder 214. The image capture device 160 may be secured to the angled plate 230 via one or more fasteners such as brackets, clamps, elastic bands, Velcro, and/or the like. The angled plate 230 may act as an image capture device mounting feature, by which the image capture device 160 can be adjustably mounted to the coupling device 180.

In some embodiments, the holder 214 may be stationary relative to the telescope 110, but may be designed to permit adjustment of the orientation of the image capture device 160 relative to the telescope 110. For example, the angled plate 230 may be pivotably coupled to a body 232 of the holder 214 by a hinge 234. An adjustment device may be used to facilitate user adjustment and/or fixation of the orientation of the angled plate 230. In some embodiments, such adjustment may permit the field-of-view 132 of the telescope 110 to pass entirely out of the field-of-view of the image capture device 160. In such embodiments, the user may need to measure, record, and enter the angular offset subsequently to facilitate operation of the plate solving algorithm. Alternatively, as mentioned previously, adjustability may be limited (i.e., mechanically) such that part or all of the field-of-view 132 of the telescope 110 must remain within the field-of-view of the image capture device 160.

In FIG. 2, the adjustment device may include an arcuate slot 236 formed in the body 232. A knob 238 may reside in the arcuate slot 236, and may protrude outside the holder 214 so that the user can easily grasp the knob 238 and move it upward/distally or downward/proximally in order to angle the angled plate 230 nearer perpendicularity to the housing 120, or nearer parallelism with the housing 120, respectively.

The holder 214 may also have a locking device that enables the user to lock the angled plate 230 in a desired orientation. In some examples, the knob 238 may serve this function in addition to facilitating adjustment of the orientation of the angled plate 230 as described above. For example, the knob 238 may be rotatable to frictionally engage the body 232, or to disengage from the body 232 depending on the direction of rotation, thereby enabling the user to rotate the knob 238 to unlock thee orientation of the angled plate 230, and then lock the angled plate 230 into position after it has been reoriented as desired. Alternative locking devices include, but are not limited to, set screws, clips, clamps, detents, and the like.

The hinge 234, the arcuate slot 236, and the knob 238 represent only one of many embodiments of adjustment and/or locking devices that may be used to orient and/or lock the image capture device 160 into a desired orientation relative to the housing 120 of the telescope 110. Those of skill in the art will recognize that numerous alternatives may be used within the scope of the present disclosure.

The body 232 of the holder 214 may further have a mirrored surface 250 at the forward (i.e., distal) end of the holder 214, and a viewing section 252. The mirrored surface 250 may face proximally, into the interior of the holder 214. The viewing section 252 may be translucent and/or transparent so that the user can readily see into to the interior of the holder 214, for example, along the line of sight 262 illustrated in FIG. 2, which reflects off of the mirrored surface 250 as shown. The viewing section 252 may encompass part or all of one or more of the walls of the holder 214. In alternative embodiments, the viewing section 252 may be replaced with an opening that provides an entirely unobstructed view into the interior of the holder 214. In some alternative embodiments, the mirrored surface 250 may be replaced by a prism or other optical element that redirects light from the output device 172 to a path along which it is readily viewed by the user.

The image capture device 160 may have an output device 172 in the form of a display screen, which may optionally be a touch screen. Further, the camera 162 of the image capture device 160 may be forward-facing (i.e., facing toward a user viewing the output device 172). The image capture device 160 may have multiple cameras; in some embodiments, the image capture device 160 may have a rearward-facing camera (not shown) in addition to the camera 162. In some embodiments, it may be advantageous to use the rearward-facing camera instead of the forward-facing camera.

The image capture device 160 may be placed on the angled plate 230 such that the camera 162 and the output device 172 are both angled upward. Thus, the field-of-view 260 of the camera 162 may extend upward and/or forward, through the viewing section 252, as depicted in FIG. 2. This may provide the camera 162 with a relatively unobstructed view of the sky, in a wide range of orientations of the angled plate 230. The output device 172 may be oriented into the interior of the holder 214. Accordingly, the user may view the output device 172 along a line of sight 262 passing through the viewing section 252 and reflecting off of the surface 250, toward the output device 172. The user's view of the output device 172 may be backward due to the presence of the surface 250 in the optical pathway. Accordingly, the app run by the image capture device 160 to facilitate orientation of the telescope 110 may compensate for this (for example, by reversing all output via the output device 172, from left-to-right).

In operation, the user may initially provide input to calibrate the system, thereby providing an angular offset between the telescope 110 and the image capture device 160. This may be done by explicitly entering an angular offset between the telescope 110 and the image capture device 160. Alternatively, as mentioned previously, the field-of-view 132 of the telescope 110 may be at least partially within the field-of-view of the image capture device 160. In such embodiments, the user may provide the angular offset between the telescope 110 and the image capture device 160 by, for example, orienting the telescope 110 such that an object is within (or possibly centered within) the field-of-view 132 of the telescope 110, and then selecting the object in the image that is subsequently captured with the image capture device 160, thereby providing the angular offset between the telescope 110 and the image capture device 160.

After calibration (or, in alternative embodiments, before calibration), the user may enter the subject desired to be viewed through the telescope 110, and the angular offset between the telescope 110 and the image capture device 160, into the app running on the image capture device 160. The image capture device 160 may capture one or more images of a reference subject, which may be, for example, one or more celestial bodies. As mentioned previously, after image capture, the user may complete system calibration by selecting the object that was positioned and/or centered within the field-of-view 132 of the telescope 110, for example, with an adjustable crosshair.

Once the picture and any other needed input have been obtained, the app may then compare the image data with a mapping, such as a mapping of celestial bodies, to determine the initial (i.e., current) orientation of the telescope 110. The app may further compute the angular motion needed to reorient the telescope 110 to a desired orientation, in which the telescope 110 is positioned to view the desired subject matter. Instructions for moving the telescope 110 to the desired orientation may appear on the output device 172. The user may view these instructions and reorient the telescope 110 accordingly. This method will be described in greater detail with reference to FIG. 7.

The coupling device 180 of FIG. 2 is just one of many embodiments within the scope of the present disclosure. In some alternative embodiments, the orientation of the image capture device 160 need not be adjustable. For example, rather than moving the image capture device 160, an optical element within the field-of-view 260 of the camera 162 of the image capture device 160 may be moved to direct light from the reference subject into the camera 162. The position of the optical element may be adjusted to effect selection of the reference subject without moving the image capture device 160. In some embodiments, adjustability may be limited to adjustments that maintain the field-of-view 132 of the telescope 110 at least partially within that of the image capture device 160, as mentioned previously. One example of a movable optical element will be shown and described in connection with FIG. 3.

Figure 3:
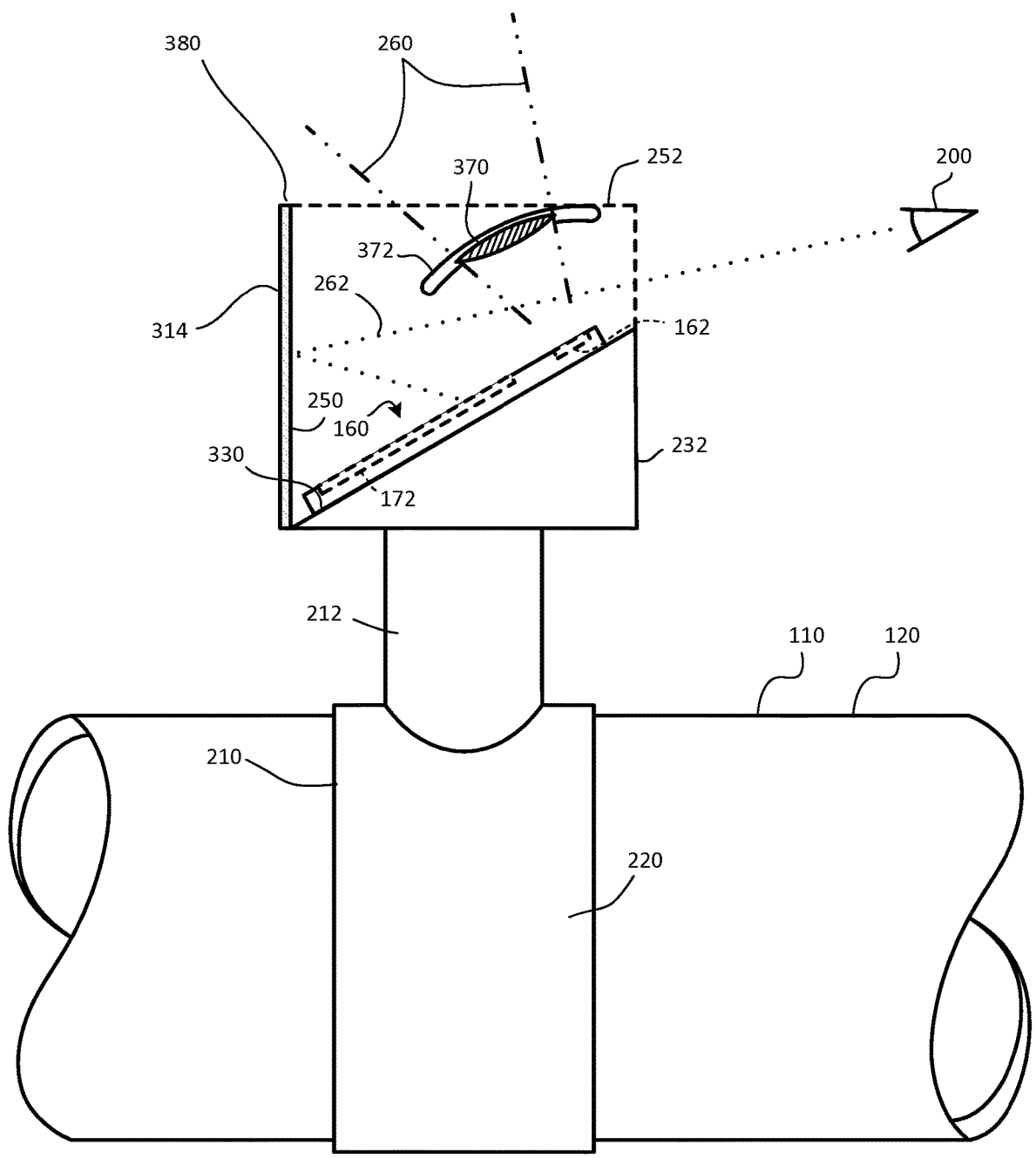
FIG. 3 is a side elevation view of a portion of the telescope of FIG. 1, with the image capture device coupled to the housing through the use of a coupling device according to one alternative embodiment.

Referring to FIG. 3, a side elevation view depicts a portion of the telescope 110, with the image capture device 160 coupled to the housing 120 through the use of a coupling device 380 according to one alternative embodiment. Like the coupling device 180 of FIG. 2, the coupling device 380 may position the image capture device 160 above the housing 120, at a position at which a user can readily view the image capture device 160 without moving his or her eye far from the eyepiece 130 of the telescope 110.

The coupling device 380 may have an optical device mounting feature 210 and an extension arm 212 that are similar in configuration and function to those of the coupling device 180. The coupling device 380 may also have a holder 314 that is similar to the holder 214 of FIG. 2, with some key differences. For example, the holder 314 may have a body 232, a mirrored surface 250, and a viewing section 252 similar to those of the holder 214. However, in place of the angled plate 230 that can pivot within the holder 214, the holder 314 may have an angled plate 330 that is substantially stationary relative to the remainder of the holder 314. Accordingly, the hinge 234, the arcuate slot 236, and the knob 238 may be omitted. As mentioned previously, in some embodiments, it may be advantageous to use a rearward-facing camera rather than the camera 162, which is forward-facing.

The holder 314 may further have an optical element 370 placed in the optical pathway through which the camera 162 receives light from the reference subject. In this application, an "optical element" may be any object that reflects, refracts, and/or otherwise directs light, including but not limited to lenses, prisms, mirrors and the like. The optical element 370 may optionally be a lens as shown. The optical element 370 may focus light, for example, from one or more celestial bodies, on the camera 162. One or more additional optical elements may be included. If desired, all optical elements included in the coupling device 380 may operate as a telephoto lens, a wide-angle lens, or the like, to provide magnification or a wider view, as needed by the app to recognize the reference subject in the image captured by the camera 162. In some embodiments, the telescope 110 is used as the optical element through which the image capture device 160 captures the imagery. In such embodiments, the subject object may be viewed, for example, on the output device 172 of the image capture device 160 when the telescope 110 has been properly oriented at the subject object.

The optical element 370 may optionally be movable to direct the camera 162 at the desired reference subject. According to one example, the optical element 370 may be coupled to an element, such as a pin or knob (not shown) that slides along a slot 372 in the body 232 of the holder 314. The optical element 370 may thus be slidable forward and rearward to direct light from a reference subject positioned forward or rearward of the location at which the field-of-view 260 of the camera 162 is directed. If desired, a knob or other implement (not shown) may protrude through the slot 372 to be grasped and manipulated by a user to move the optical element 370 within the holder 314. Optionally, a locking device may optionally be incorporated into such an implement and/or otherwise coupled to the optical element 370 to lock the optical element 370 in a desired position, relative to the camera 162. Adjustability of the position of the optical element 370 relative to the image capture device 160 may optionally be limited to relative positions in which the field-of-view 132 of the telescope 110 is partially or entirely within the field-of-view of the image capture device 160.

The operation of the coupling device 380 may be similar to that of the coupling device 180 of FIG. 2. However, rather than adjusting the orientation of the image capture device 160, the user may instead adjust the orientation of the optical element 370. In alternative embodiments, a coupling device may provide for rotational adjustment of the image capture device 160 and/or one or more optical elements. Such adjustability may optionally be limited such that the field-of-view 132 of the telescope 110 remains partially or entirely within the field-of-view of the image capture device 160. One such embodiment will be shown and described in connection with FIGS. 4 and 5.

Figure 4:
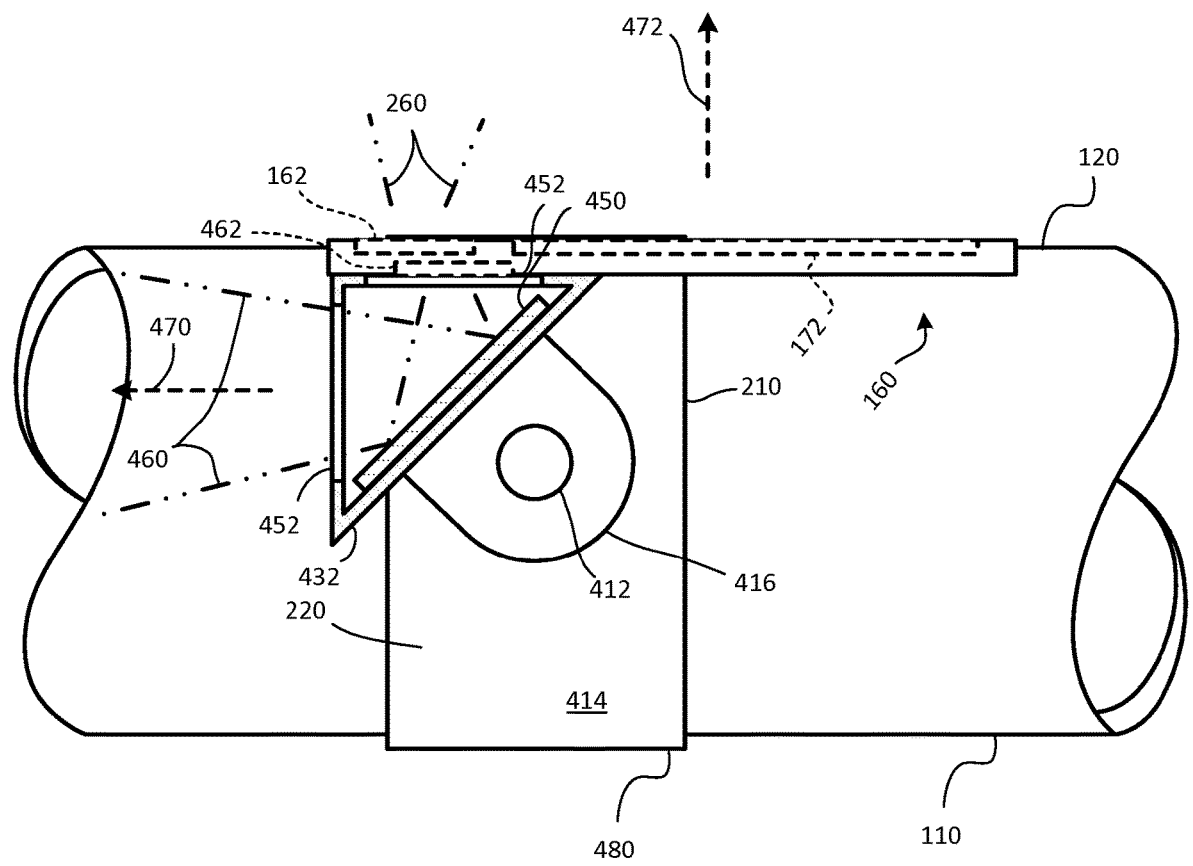
FIG. 4 is a side elevation view of a portion of the telescope of FIG. 1, with the image capture device coupled to the housing through the use of a coupling device according to another alternative embodiment.

Referring to FIG. 4, a side elevation view depicts a portion of the telescope 110, with the image capture device 160 coupled to the housing 120 through the use of a coupling device 480 according to another alternative embodiment. The coupling device 480 may position the image capture device 160 beside the housing 120, at a position at which a user can readily view the image capture device 160, even when the telescope 110 is oriented vertically. Specifically, the image capture device 160 may be generally parallel to the axis of the telescope 110 such that the user can easily view the output device 172 (such as a display screen) from a position above the housing 120 of the telescope 110. This may cause the field-of-view 132 of the telescope 110 to be within the field-of-view of the image capture device 160.

The coupling device 480 may have an optical device mounting feature 210, an extension arm 412, and an attachment block 414 coupled to the extension arm 412 via a flange 416. The optical device mounting feature 210 may be similar in configuration and function to that of the coupling device 180. The extension arm 412 may extend laterally to position the attachment block to one side (for example, the right side or the left side) of the telescope 110. The attachment block 414 may pivotably couple the image capture device 160 to the extension arm 412 with the aid of the flange 416, thereby cooperating with the optical device mounting feature 210 to provide adjustable mounting of the image capture device 160 relative to the telescope 110. As in previous embodiments, the angular adjustability between the telescope 110 and the image capture device 160 may be limited such that the field-of-view 132 of the telescope 110 remains partially or entirely within the field-of-view of the image capture device 160.

The attachment block 414 need not be sized to contain the image capture device 160. Rather, the image capture device 160 may be secured to the exterior of the attachment block 414, for example, by one or more fasteners such as brackets, clamps, elastic bands, Velcro, and/or the like. For example, any of the fastening systems and methods set forth in U.S. application Ser. No. 14/882,814, referenced above, may be used to secure the image capture device 160 to the attachment block 414. Thus, the attachment block 414 may act as an image capture device mounting feature that mounts the image capture device 160 to the coupling device 480.

In alternative embodiments, a wide variety of functionally similar arrangements may be used to connect the image capture device 160 to the telescope 110 and/or to one or more optical elements. According to some alternative embodiments, the attachment block 414 need not be secured directly to the image capture device 160, but may instead be secured to a holder, and the attachment block 414 may be coupled to the holder, either directly or via an extension arm or the like. In some embodiments, the attachment block may be omitted, and a mirror, prism, or optical element may be secured to a holder that holds the image capture device 160 with an extension arm or the like. Those of skill in the art will recognize that a wide variety of mechanical elements may be used to couple the image capture device 160 to the telescope 110 and/or to one or more optical elements.

In some embodiments, the flange 416 may be pivotably coupled to the extension arm 412 such that the attachment block 414 is rotatable relative to the collar 220. In alternative embodiments, the flange 416 may be fixedly attached to the extension arm 412, but the extension arm 412 may be pivotably coupled to the collar 220. In any case, the attachment block 414 may be rotatable relative to the telescope 110, about an axis extending to either side of the telescope 110 (i.e., in and out of the page, with respect to the view of FIG. 4). If desired, a locking device may be included to enable the user to selectively lock out rotation to keep the image capture device 160 stationary relative to the telescope 110, optionally, such that the field-of-view 132 of the telescope 110 remains partially or entirely within the field-of-view of the image capture device 160.

As in the previous embodiment, the image capture device 160 may have a camera 162 that is forward-facing, or faces toward a user viewing the output device 172. Additionally, the image capture device 160 may have a camera 462 that faces rearward, or away from a user viewing the output device 172. The camera 162 may have a field-of-view 260 as in the previous embodiments. Similarly, the camera 462 may have a field-of-view 460. Either of both of the camera 162 and the camera 462 may be used to capture image data to facilitate orientation of the telescope 110 at the subject of interest.

The attachment block 414 may have a body 432 that is generally in the shape of a triangular extrusion. The body 432 may define a pair of apertures 452. One of the apertures 452 may be positioned on the forward end of the attachment block 414 to allow light to enter the interior of the attachment block 414. The other aperture 452 may be positioned in alignment with the camera 462 such that the light within the attachment block 414 can enter the camera 462. A mirrored surface 450 may be positioned in the interior of the attachment block 414 and oriented to reflect light entering the interior of the attachment block 414 from the aperture 452 at the forward end to the aperture 452 aligned with the camera 462. Thus, the field-of-view 460 of the camera 462 may be reflected off of the mirrored surface 450 to extend forward of the attachment block 414, as shown in FIG. 4.

The attachment block 414 may optionally have the shape of a right triangle, with two 45° angles. Thus, the attachment block 414 may provide the camera 462 with an image capture direction 470, along which the field-of-view 460 of the camera 462 is centered, that extends parallel to the length of the image capture device 160. The image capture direction 470 may be substantially perpendicular to a viewing direction 472 that is perpendicular to the output device 172, which may be the optimal direction for viewing the output device 172. This perpendicularity may provide favorable ergonomics and usability, as the user may be able to look generally horizontally and downward, while capturing image data from a reference subject above the telescope 110 (for example, in the sky forward of the telescope 110). If the field-of-view 132 of the telescope 110 is to remain partially or entirely within the field-of-view 460 of the image capture device 160, this may limit the rotation that is permitted between the image capture direction 470 and the axis of the telescope 110.

The ability of the user to rotate the image capture device 160 relative to the telescope 110 may provide benefits in terms of ergonomics and ease of capturing image data of an appropriate reference subject. For example, the user may rotate the attachment block 414 and the image capture device 160 to an orientation at which his or her eyes are near the viewing direction 472. Additionally or alternatively, the user may rotate the attachment block 414 and the image capture device 160 to an orientation at which the image capture direction 470 is oriented most directly at the reference subject. This orientation may be limited, for example, mechanically, such that the field-of-view 132 of the telescope 110 remains partially or entirely within the field-of-view 460 of the image capture device 160. For example, the collar 220, the extension arm 412, and/or the flange 416 may have one or more mechanical stops that limit relative rotation between the telescope 110 and the image capture device 160 and/or the attachment block 414. Adjustment between these elements will be further illustrated in connection with FIG. 5.

Figure 5:
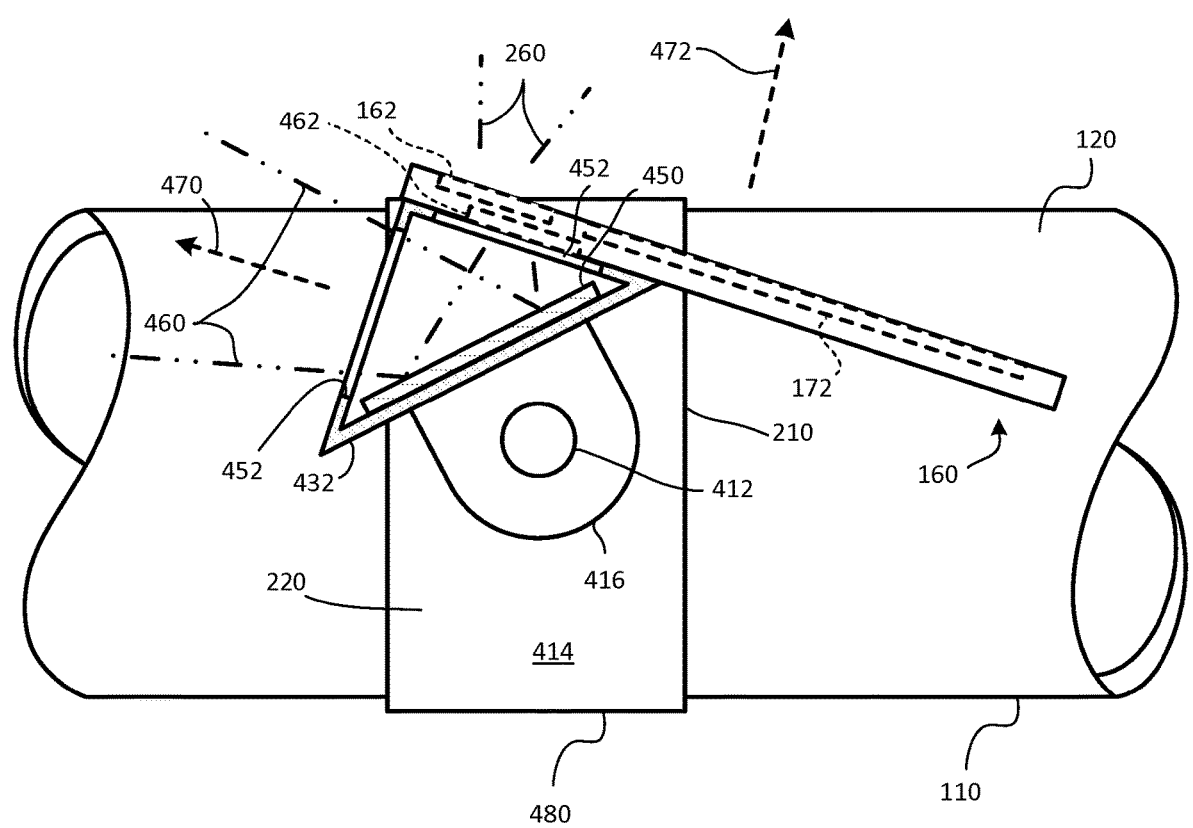
FIG. 5 is a side elevation view of a portion of the telescope, with the image capture device coupled to the housing through the use of the coupling device of FIG. 4, with the image capture device rotated to a different orientation relative to the telescope.

Referring to FIG. 5, a side elevation view depicts a portion of the telescope 110, with the image capture device 160 coupled to the housing 120 through the use of the coupling device 480 of FIG. 4, with the image capture device 160 rotated to a different orientation relative to the telescope 110. Specifically, the attachment block 414 and the image capture device 160 have been rotated (for example, via rotation of the flange 416 relative to the extension arm 412) to angle the viewing direction 472 rearward, and to angle the image capture direction 470 upward. This orientation may be more suitable for a user with a lower eye level, or to facilitate the capture of image data for a reference subject more directly overhead.

The field-of-view 132 of the telescope 110 may be orientable off-center relative to that of the image capture device 160, keeping the field-of-view 132 of the telescope 110 at least partially within the field-of-view 460 of the image capture device. Thus, the attachment block 414 and the image capture device 160 may be rotated such that the image capture device 160 is limited to angles ranging from 0° to 25° from parallelism with the axis of the telescope 110. More precisely, rotation of the image capture device 160 may be limited to angles of less than 20° from parallelism with the axis of the telescope 110, angles of less than 15° from parallelism with the telescope 110, angles of less than 10° from parallelism with the telescope 110, or even angles of less than 5° from parallelism with the telescope 110. The range of angular adjustment may depend on the type of lens used in the camera 462 of the image capture device 160, with wider angle cameras allowing more freedom of relative rotation. Some smartphone lenses may permit angular adjustment limited to about 15° in order to maintain the field-of-view 132 of the telescope 110 at least partially within the field-of-view 460 of the image capture device 160.

Various optical elements may be used in connection with a coupling device such as the coupling device 480 of FIGS. 4 and 5. Examples will be depicted in connection with FIG. 6.

Figure 6:
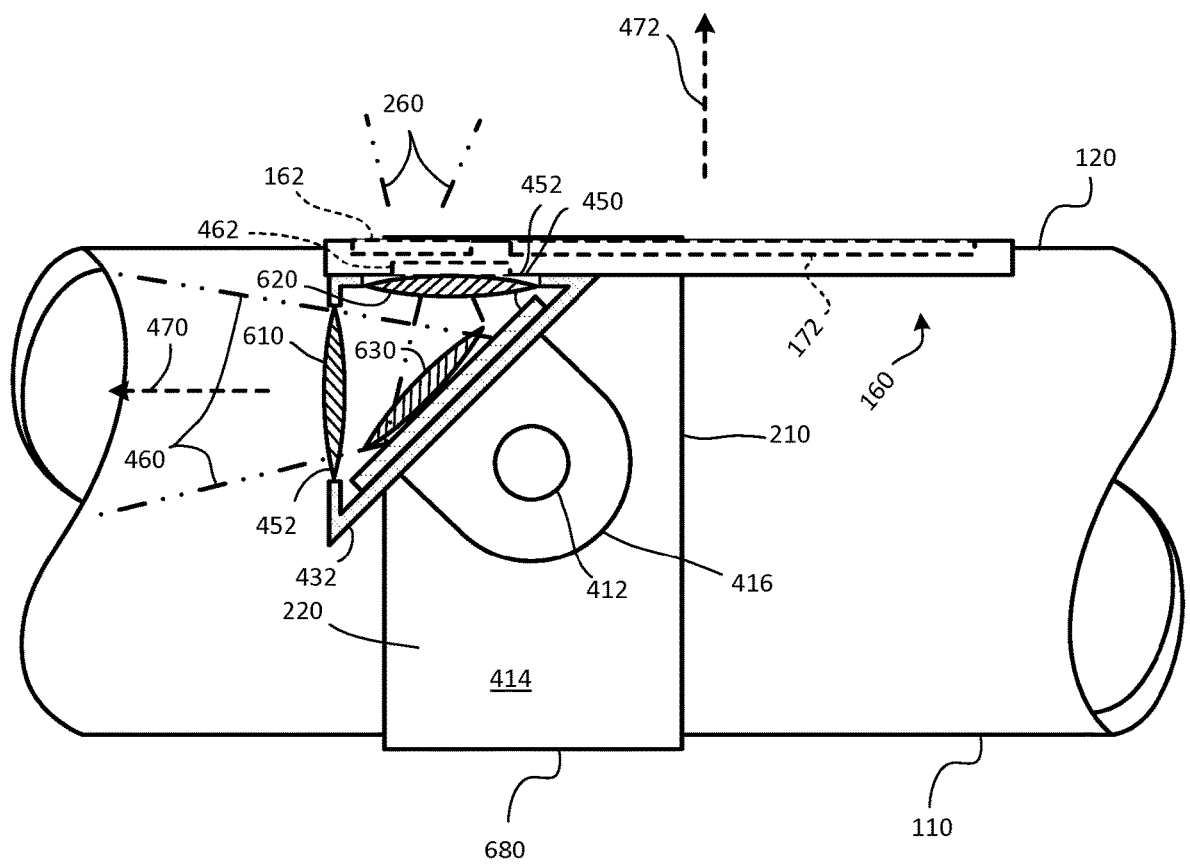
FIG. 6 is a side elevation view of a portion of the telescope, with the image capture device coupled to the housing through the use of the coupling device of FIGS. 4 and 5, wherein the coupling device has one or more optical elements.

Referring to FIG. 6, a side elevation view depicts a portion of the telescope 110, with the image capture device 160 coupled to the housing 120 through the use of a coupling device 680 according to another alternative embodiment. The coupling device 680 is similar to the coupling device 480 of FIGS. 4 and 5, except that the coupling device 680 has one or more optical elements in the form of a lens 610, a lens 620, and/or a lens 630 positioned in the field-of-view 460 of the camera 462 of the image capture device 160.

Specifically, the lens 610 is positioned in the aperture 452 of the body 432 of the attachment block 414 that faces forward, toward the field-of-view 132 of the telescope 110. The lens 620 is positioned in the aperture 452 of the body 432 of the attachment block 414 that faces toward the camera 462 of the image capture device 160. The lens 630 is positioned over the mirrored surface 450 such that light entering the body 432 passes through the lens 630 before reflecting off of the mirrored surface 450, and then passes through the lens 630 again before reaching the camera 462.

The coupling device 680 may have any or all of the lens 610, the lens 620, and/or the lens 630. Additionally or alternatively, other optical elements may be used in addition to or in the alternative to any of the foregoing. For example, one or more lenses may be positioned within the field-of-view 460 of the camera 462, outside the body 432; various extensions may be used to connect such lenses to the body 432. One or more such lenses may be used to provide any desired magnification or reduction level in the images captured by the image capture device 160.

The coupling devices 180, 380, 480, and 680 are merely exemplary. Many alternative coupling devices may be used, with a wide variety of devices to couple the coupling device to the telescope 110 or the image capture device 160, and with a wide variety of adjustment and/or locking devices. According to some alternative embodiments, the image capture device 160 may be coupled to the telescope 110 such that the image capture device 160 captures the image data directly through the telescope 110. Examples of such attachment are set forth in U.S. patent application Ser. No. 14/882,814, referenced previously.

Figure 7:
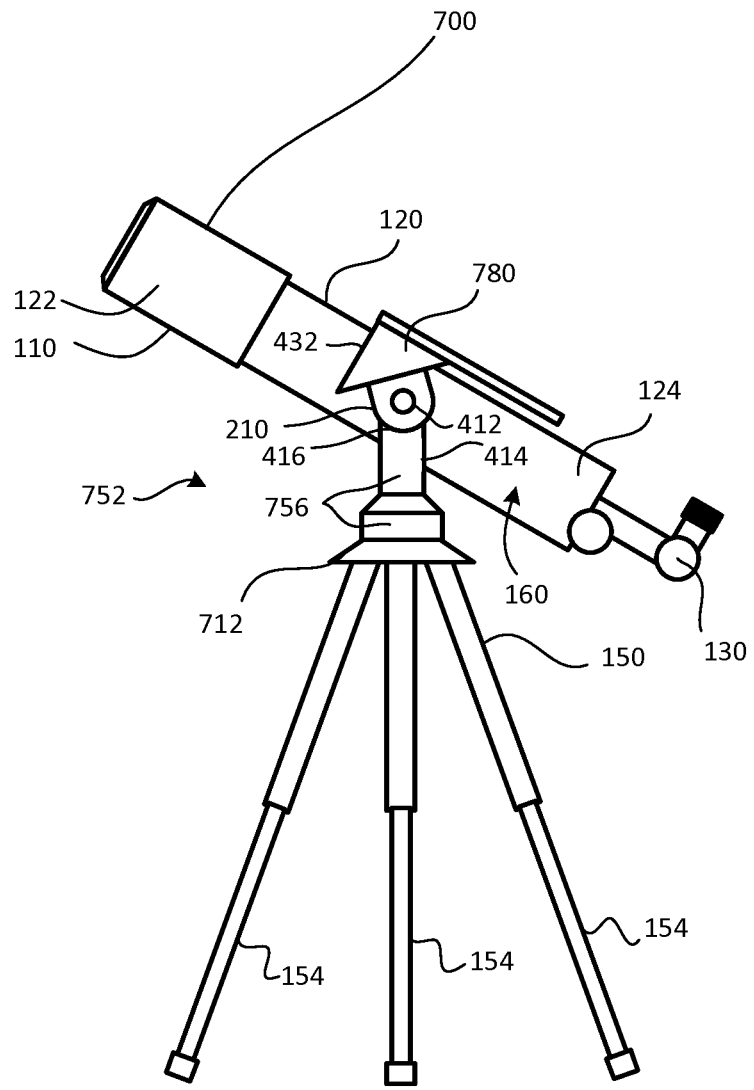
FIG. 7 is a side elevation view of an optical device in the form of a telescope system, according to another alternative embodiment.

Referring to FIG. 7, a side elevation view depicts an optical device in the form of a telescope system 700, according to another alternative embodiment. As shown, the telescope system 700 may include a telescope 110 as in the telescope system 100 of FIG. 1, and a support 712. The telescope 110 may be supported by the support 712 at an orientation suitable for viewing and/or photographing a subject, such as one or more celestial bodies. The support 712 may facilitate orientation of the telescope 110 at the subject. In some embodiments, the support 712 may provide adjustment of the azimuth and elevation of the orientation of the telescope 110.

The support 712 may have a base portion 150 and a telescope mounting portion 752. The base portion 150 may provide stable support for the telescope mounting portion 752, and thence, for the telescope 110. The telescope mounting portion 152 may have one or more joints 756 that can be adjusted to adjust the orientation of the telescope 110 relative to the support 712. The telescope mounting portion 752 may have one or more mounting features that mate with and/or are otherwise secured to the telescope 110, for example, via attachment to an accessory mount (not shown) or other support attachment feature of the telescope 110. The joints 756 may optionally be manually adjusted, and may lack any feature that moves them automatically to orient the telescope 110.

The image capture device 160 may advantageously be coupled to the telescope 110 to facilitate alignment of the telescope 110 with the image capture device 160. The telescope system 700 may also have a coupling device 780 that can be used to couple the image capture device 160 to the telescope 110. The coupling device 780 may be designed to secure the image capture device 160 to the telescope mounting portion 752 support 712, rather than to the telescope 110. According to some examples, the coupling device 780 may be secured to one of the joints 756 of the telescope mounting portion 752, such as the joint that controls elevation of the telescope 110.

The coupling device 780 may cause the image capture device 160 to swivel with the telescope 110 such that the elevation of the image capture device 160 is tied to that of the telescope 110. In the alternative, the elevation of the image capture device 160 may be determined independently of that of the telescope 110. The coupling device 780 may have an elevation measurement indicator (not shown) that indicates differential elevation between the image capture device 160 and the telescope 110. Additionally or alternatively, the coupling device 780 may constrain motion of the image capture device 160 relative to the telescope 110 such that the field-of-view 132 of the telescope 110 must remain fully or partially within the field-of-view of the image capture device 160.

Many different methods may be used in conjunction with a coupling device according to the present disclosure. One exemplary method will be set forth in connection with FIG. 8, as follows.

Exemplary Orientation Method

Figure 8:
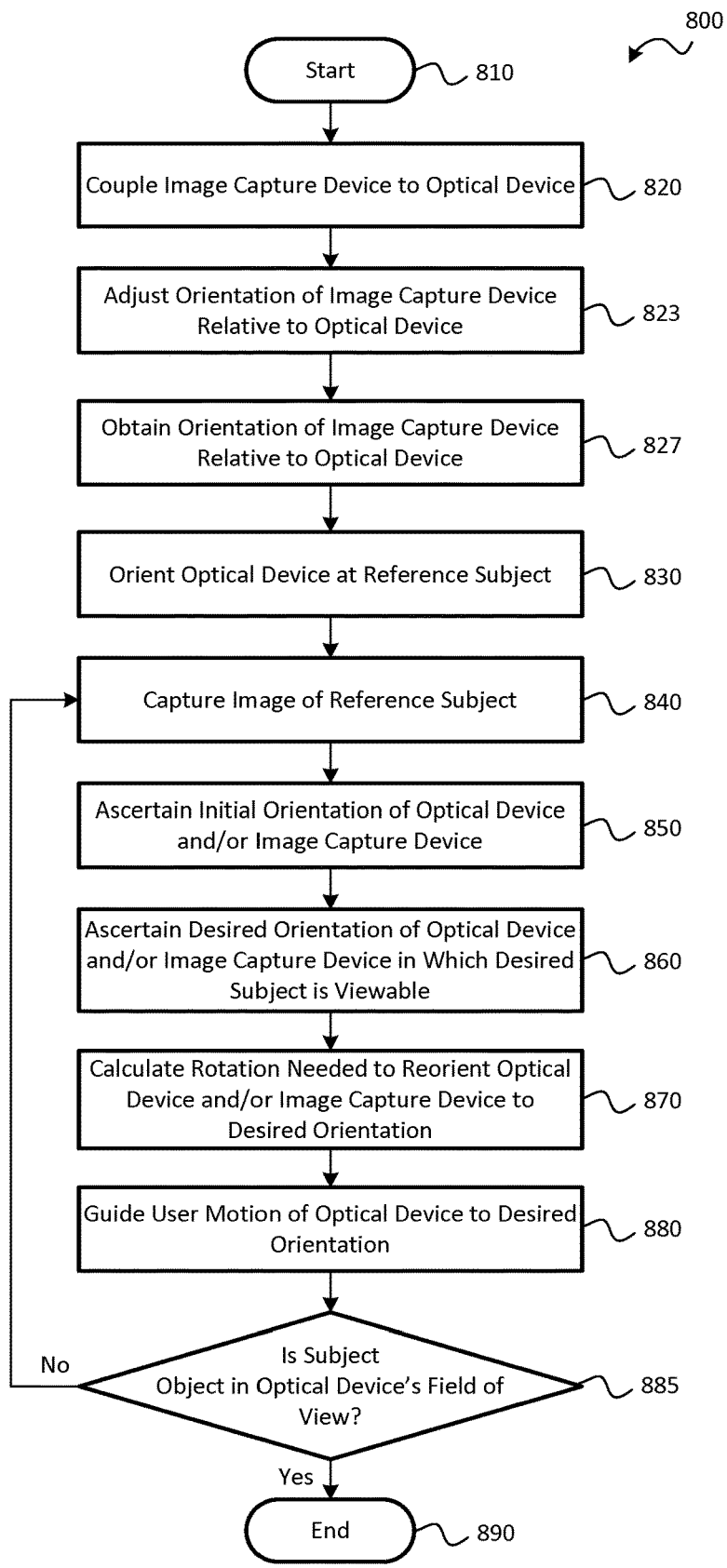
FIG. 8 is a flowchart diagram of a method of orienting an optical device according to one embodiment.

Referring to FIG. 8, a flowchart diagram illustrates a method 800 of orienting an optical device according to one embodiment. The method 800 will be described in connection with the telescope system 100, including the telescope 110 and the coupling device 180 of FIGS. 1 and 2. However, the method 800 is not limited to the telescope system 100 of these figures, but may instead be used in connection with other optical devices, image capture devices, and/or coupling devices according to various alternative embodiments.

The method 800 may start 810 with a step 820 in which the image capture device 160 is coupled to the telescope 110. This may be done, for example, by coupling the coupling device 180 to the telescope 110, and then coupling the image capture device 160 to the coupling device 180. Specifically, in the embodiment of FIG. 1, the coupling device 180 may be coupled to the telescope 110 by securing the collar 220 around the housing 120 of the telescope 110, and the image capture device 160 may be coupled to the coupling device 180 by securing the image capture device 160 to the angled plate 230. In the embodiment shown in FIG. 7, the coupling device 780 may be coupled to the support 712 rather than to the telescope 110, as described above.

In a step 823, the orientation of the image capture device 160 relative to the optical device (such as the telescope 110) may be adjusted. The user may adjust (for example, manually) the orientation of the image capture device 160 relative to the telescope 110 until the image capture device 160 is at a comfortable orientation for viewing and/or control. This may entail adjusting one or more rotary joints of the coupling device 180. In the coupling device 180, this adjustment may be carried out by pivoting the angled plate 230 to orient the image capture device 160, and then optionally, locking the angled plate 230 in place to prevent further pivotal motion. As mentioned previously, adjustment of this relative orientation may be limited to cause the field-of-view 132 of the telescope 110 to remain at least partially within the field-of-view 260 of the image capture device 160.

In a step 827, the orientation of the image capture device 160, relative to the telescope 110, may be obtained by the system that is to carry out plate solving. Where the image capture device 160 is a smartphone, this may entail obtaining the relative orientation in the smartphone. In some embodiments, the user may measure and enter the relative orientations. In alternative embodiments, the relative orientations may be ascertained by the system, for example, with the aid of user input. The step 827 may be termed a calibration step.

Specifically, in some embodiments, the user may orient the telescope 110 at a particular object, such as a bright star or a distant terrestrial light. The user may then capture an image with the image capture device, containing the object. Then, the user may indicate the position of the object within the image. This may be done, for example, by positioning an indicator such as a set of crosshairs over the object, through the use of the input device 170 and/or the output device 172 of the image capture device 160. The direction and magnitude of the displacement between the crosshairs and the center of the image may then be used by the system to ascertain the relative orientations between the telescope 110 and the image capture device 160, without requiring the user to measure and/or explicitly input the angular offset.

In alternative embodiments, the user may measure the relative orientation and provide it via user input to the image capture device 160, indicating the relative orientation. This may be accomplished using manual measurement, or through tools provided by the coupling device 180. For example, the holder 214 may have markings at different locations near the arcuate slot 236, indicating a relative angle between the image capture device 160 and the telescope 110 for each position of the knob 238 within the arcuate slot 236. If desired, the arcuate slot 236 may have a limited number of discrete positions at which the knob 238 can easily reside; for example, the arcuate slot 236 may have recesses (not shown) along its length, into which the knob 238 can be inserted. Each recess may have an associated relative orientation that can be entered into the image capture device 160. Use of a limited number of discrete relative orientation settings may facilitate user entry of an accurate relative orientation.

The coupling device 380 and the coupling device 480 may have different systems for displaying and/or discretizing the relative orientation between the image capture device 160 and the telescope 110 to facilitate accurate entry of the relative orientation into the app. Those of skill in the art will recognize that a wide variety of ways exist to indicate relative orientation and/or limit relative orientation to a limited number of discrete settings. In embodiments in which the image capture device 160 is aligned with the telescope 110, such as embodiments in which the image capture device 160 captures the image data through the telescope 110, no offset data may be needed. In general, such manual entry of the relative orientation may require more effort for the user, but may also provide more flexibility in the relative orientation between the image capture device 160 and the telescope 110.

In a step 830, the image capture device 160 may be oriented to capture image data of a reference subject, such as one or more celestial bodies. This may be done by reorienting the telescope 110, together with the image capture device 160, such that the field-of-view 260 of the camera 162 includes the reference subject.

In a step 840, the image capture device 160 may capture image data of the reference subject. This may be done by activating the camera 162 of the image capture device 160 such that the camera 162 generates the image data based on light received from within the field-of-view 260. The camera 162 may be activated through use of the input device 170, which may be a touch screen or the like. In the alternative, the camera 162 may be activated remotely through use of a remote control, timer, or the like. As yet another alternative, the camera 162 may continuously record video; recording may be initiated prior to insertion of the image capture device 160 into the holder 214, and may continue until the next step is successfully completed.

In a step 850, an initial orientation of the telescope 110 and/or the image capture device 160 may be ascertained using the image data captured in the step 840. It may be desirable to determine the orientation of the telescope 110 at this stage; in order to do so, the app may require the orientation of the image capture device 160 relative to the telescope 110, obtained in the calibration carried out in the step 827.

With the aid of the relative orientation and the image data, the app may then ascertain the direction in which the telescope 110 is oriented, or the initial orientation of the telescope 110. This may be done by analyzing the image data to identify one or more objects, such as celestial bodies, appearing in the image data. In at least one embodiment, the app running on the mobile device uses digital comparison of viewed celestial objects with stored information about known celestial objects, so as to provide an accurate indication of the initial orientation. Such an approach can be more accurate than relying solely an internal gyroscope and/or accelerometer as may be commonly found in mobile devices.

In at least one embodiment, the visual tracking information and matching technique is used in combination with an internal gyroscope, GPS data, compass data, and/or accelerometers; alternatively the visual tracking information and matching technique can be used on its own. In either case, plate solving methods including but not limited to those set forth in U.S. patent application Ser. No. 12/983,065, referenced previously, may be applied.

As mentioned previously, the image capture device 160 may be a smartphone that provides and/or tracks data such as date, time, location, compass heading, altitude, and/or motion. In some embodiments, the date, time, and location of the image capture device 160 are used in combination with the azimuth position (provided by the compass) and the elevation position (provided by the gyroscope) to determine an approximate position of the portion of the sky captured by the camera 162 of the image capture device 160. This may be done independently of image analysis-based plate solving techniques. Then, plate solving may be applied to ascertain the location of the portion of the sky captured by the camera 162 with greater accuracy.

In some examples, a plate solving technique is used to process the image data in a manner that extracts star positions from the image data. The extracted star imagery may then be compared with stored information regarding expected star positions, so as to determine the orientation of the mobile device with high precision. Plate solving techniques, such as those described in the above-referenced U.S. patent application Ser. No. 12/983,065, can be used to perform such functions. In at least one embodiment, the app corrects for any distortion that may exist in the camera 162. For example, a distortion grid sheet can be used to calibrate the camera 162 for accurate readings.

In a step 860, the desired orientation of the telescope 110 and/or the image capture device 160, in which the desired subject is viewable through the telescope 110, may be ascertained. This may be done by referencing the stored information regarding celestial objects to ascertain the necessary orientation of the telescope 110 to view the desired subject. In some embodiments, the user may enter the name of a particular celestial body or group of celestial bodies into the app, and the app may identify the entered celestial body or group in the database, and compute the desired orientation.

In a step 870, the rotation needed to reorient the telescope 110 from the initial orientation to the desired orientation may be calculated. This may entail calculating rotational displacements in two axes (for example, horizontal and vertical axes).

In a step 880, the rotational displacements calculated in the step 870 may be used to guide rotation of the telescope 110 to the desired orientation. In some embodiments the step 880 may be carried out by guiding the motion of motors coupled to the joints 156 of the telescope mounting portion 152 to orient the telescope 110 to the desired orientation without user intervention. In alternative embodiments, particularly embodiments in which the joints 156 of the telescope mounting portion 152 are manually operated and not motor-driven, the step 880 may include outputting guidance to a user so that the user can manually rotate the telescope 110.

Such output can be provided in a wide variety of ways, such as visually (with arrows or the like), audibly (with spoken instructions or tones corresponding to motion in predetermined directions), or even with vibration or other haptic and/or tactile forms of output. In some embodiments, where the output device 172 is a display screen, the instructions may be displayed on the output device 172 so that the user can view and follow them by rotating the telescope 110 in a corresponding fashion.

The image capture device 160 may measure the rotation undertaken by the user and notify the user when the telescope 110 is oriented at the desired orientation. In some embodiments, in order to more accurately determine whether the telescope 110 is properly oriented, the method 800 may iterate multiple times through some of the steps of the method 800. Thus, pursuant to a query 885, the system may determine whether the subject object is within the field-of-view 132 of the telescope. If the subject object is not within the field-of-view 132 of the telescope, 110, the steps 840, 850, 860, 870, and 880 may be repeated at particular time intervals, or even continuously, until the desired orientation has been obtained. Once the desired orientation has been obtained, the method 800 may end 890.

In some embodiments, the step 880 may be performed through the use of a continuous feedback loop in which sensor data from the image capture device 160 and/or plate solving techniques are used to update the orientation of the telescope 110 and/or the image capture device 160, and to update user instructions for rotation of the telescope 110 accordingly. Again, plate solving techniques, based solely on imagery from the camera 162 of the image capture device 160, may be used exclusively for this purpose. However, the orientation of the telescope 110 and/or the image capture device 160 may be more rapidly ascertained through use of data tracked and/or generated by the image capture device 160, such as the date, time, location, approximate compass heading, and/or approximate elevation of the image capture device 160, as indicated previously.

In some embodiments, this data from the image capture device 160 may be used in combination with plate solving to continuously track the orientation of the telescope 110 and/or the image capture device 160 with speed and accuracy. Feedback may be continuously provided to the user regarding how to orient the telescope 110 until the desired subject is viewable through the telescope 110. If desired, the step 880 may continue to help the user maintain the desired subject in view of the telescope 110 as the Earth continues to rotate relative to the desired subject.

The method 800 is merely exemplary. Various steps of the method 800 may be re-ordered, repeated, omitted, and/or replaced with alternative steps, as would be understood by a person of skill in the art with the aid of the present disclosure.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for orienting an optical device to view a first subject, the method comprising:
   coupling a coupling device to the optical device, wherein the coupling device comprises a mirrored surface;
   coupling an image capture device to the coupling device in a manner that enables adjustment of an orientation of the image capture device relative to the coupling device, wherein the image capture device comprises a front-facing display screen and a rear-facing camera, and wherein the mirrored surface of the coupling device is positioned to reflect light entering the optical device onto the rear-facing camera of the image capture device;
   adjusting the orientation of the image capture device relative to the coupling device;
   using the image capture device to generate image data of a reference subject;
   at a processor, comparing the image data with stored information regarding celestial objects to identify one or more celestial objects appearing in the image data and to ascertain a first orientation of the optical device;
   at the processor, ascertaining a second orientation of the optical device, at which the first subject is viewable using the optical device;
   at the processor, determining a rotation of the optical device needed to reorient the optical device from the first orientation to the second orientation; and
   at the processor, using the determined rotation to guide motion of the optical device from the first orientation to the second orientation.

2. The method of claim 1, wherein:
   the coupling device comprises at least one optical element; and
   using the image capture device to generate the image data comprises, in the image capture device, receiving light from within a field-of-view in which the at least one optical element is positioned.

3. The method of claim 1, wherein adjusting the orientation of the image capture device relative to the optical device comprises maintaining a field-of-view of the optical device at least partially within a field-of-view of the image capture device.

4. The method of claim 1, wherein:
   the coupling device comprises a holder; and
   coupling the image capture device to the coupling device comprises inserting the image capture device into the holder in a manner that enables adjustment of the orientation of the image capture device relative to the holder.

5. The method of claim 1, wherein:

the coupling device comprises an attachment block; and coupling the image capture device to the coupling device comprises attaching the image capture device to an exterior surface of the attachment block in a manner that enables adjustment of the orientation of the image capture device relative to the attachment block.

6. The method of claim 1, wherein:

the coupling device comprises at least one lens; and using the image capture device to generate the image data comprises capturing light through the at least one lens.

7. The method of claim 1, wherein:

the method further comprises, at an input device, receiving user input identifying the first subject;

and wherein:

ascertaining the second orientation of the optical device comprises identifying the first subject within stored information regarding celestial objects to obtain a location of the first subject.

8. The method of claim 1, wherein:

the method further comprises, at the processor, obtaining an angular offset between fields-of-view of the optical device and the image capture device; and using the image data to ascertain the first orientation comprises using the obtained angular offset.

9. The method of claim 1, wherein using the determined rotation to guide motion of the optical device from the first orientation to the second orientation comprises outputting instructions to a user, indicating how the user can apply the rotation to the optical device.

10. The method of claim 1, wherein:

the image capture device comprises a smartphone; and comparing the image data with stored information regarding celestial objects to ascertain a first orientation of the optical device comprises using the image data in combination with one or more data elements provided by the smartphone, selected from the group consisting of:

date data;

time data;

location data;

compass data;

accelerometer data; and gyroscope data.

11. A non-transitory computer-readable medium for orienting an optical device to view a first subject, comprising instructions stored thereon, that when performed by a processor, perform the steps of:

causing an image capture device, coupled to the optical device via a coupling device that enables adjustment of an orientation of the image capture device relative to the coupling device, to generate image data of a reference subject;

comparing the image data with stored information regarding celestial objects to identify one or more celestial objects appearing in the image data and to ascertain a first orientation of the optical device;

ascertaining a second orientation of the optical device, at which the first subject is viewable using the optical device;

determining a rotation of the optical device needed to reorient the optical device from the first orientation to the second orientation; and using the determined rotation to guide motion of the optical device from the first orientation to the second orientation;

wherein:

the coupling device comprises a mirrored surface;

the image capture device comprises a front-facing display screen and a rear-facing camera; and the mirrored surface of the coupling device is positioned to reflect light entering the optical device onto the rear-facing camera of the image capture device.

12. The non-transitory computer-readable medium of claim 11, wherein:

the non-transitory computer-readable medium further comprises instructions stored thereon, that when executed by a processor, cause an input device to receive user input identifying the first subject;

and wherein:

ascertaining the second orientation of the optical device comprises identifying the first subject within stored information regarding celestial objects to obtain a location of the first subject.

13. The non-transitory computer-readable medium of claim 11, wherein:

the non-transitory computer-readable medium further comprises instructions stored therein, that when executed by a processor, obtain an angular offset between fields-of-view of the optical device and the image capture device; and using the image data to ascertain the first orientation further comprises using the obtained angular offset.

14. The non-transitory computer-readable medium of claim 11, wherein using the determined rotation to guide motion of the optical device from the first orientation to the second orientation comprises causing an output device to output instructions to a user, indicating how the user can apply the rotation to the optical device.

15. The non-transitory computer-readable medium of claim 11, wherein:

the image capture device comprises a smartphone; and comparing the image data with stored information regarding celestial objects to ascertain a first orientation of the optical device comprises using the image data in combination with one or more data elements provided by the smartphone, selected from the group consisting of:

date data;

time data;

location data;

compass data;

accelerometer data; and gyroscope data.

16. A system for facilitating orientation of an optical device to view a first subject, comprising:

a coupling device comprising a mirrored surface;

an optical device mounting feature configured to mount the coupling device to the optical device;

an image capture device mounting feature configured to mount an image capture device to the coupling device in a manner that enables adjustment of an orientation of the image capture device relative to the coupling device, wherein the image capture device comprises a front-facing display screen and a rear-facing camera, and wherein the mirrored surface of the coupling device is positioned to reflect light entering the optical device onto the rear-facing camera of the image capture device; and a processor, configured to perform the steps of:
  comparing image data captured by the image capture device with stored information regarding celestial objects to identify one or more celestial objects appearing in the image data and to ascertain a first orientation of the optical device;
  ascertaining a second orientation of the optical device, at which the first subject is viewable using the optical device;
  determining a rotation of the optical device needed to reorient the optical device from the first orientation to the second orientation; and
  using the determined rotation to guide motion of the optical device from the first orientation to the second orientation.

17. The system of claim 16, wherein the coupling device comprises at least one optical element configured so that the image capture device receives light from within a field-of-view in which the at least one optical element is positioned.

18. The system of claim 16, wherein the image capture device mounting feature is configured to enable adjustment of the orientation at which the image capture device is coupled relative to the optical device while maintaining a field-of-view of the optical device at least partially within a field-of-view of the image capture device.

19. The system of claim 16, wherein:
the coupling device comprises a holder; and
the image capture device mounting feature is configured to mount the image capture device to the coupling device by inserting the image capture device into the holder in a manner that enables adjustment of the orientation of the image capture device relative to the holder.

20. The system of claim 16, wherein:
the coupling device comprises an attachment block; and
the image capture device mounting feature is configured to mount the image capture device to the coupling device by attaching the image capture device to an exterior surface of the attachment block in a manner that enables adjustment of the orientation of the image capture device relative to the attachment block.

21. The system of claim 16, wherein:
the coupling device comprises at least one lens; and
the image data is generated from light captured through the at least one lens.

22. The system of claim 16, further comprising:
an input device, communicatively coupled to the processor, configured to receive user input identifying the first subject;
and wherein:
ascertaining the second orientation of the optical device comprises identifying the first subject within stored information regarding celestial objects to obtain a location of the first subject.

23. The system of claim 16, wherein:
the processor is further configured to obtain an angular offset between fields-of-view of the optical device and the image capture device; and
using the image data to ascertain the first orientation further comprises using the angular offset.

24. The system of claim 16, further comprising:
an output device, communicatively coupled to the processor;
wherein using the rotation to guide motion of the optical device from the first orientation to the second orientation comprises outputting instructions to a user via the output device, the instructions indicating how the user can apply the rotation to the optical device.

25. The system of claim 16, wherein:
the image capture device comprises a smartphone; and
comparing the image data with stored information regarding celestial objects to ascertain a first orientation of the optical device comprises using the image data in combination with one or more data elements provided by the smartphone, selected from the group consisting of:
date data;
time data;
location data;
compass data;
accelerometer data; and
gyroscope data.

26. The system of claim 16, wherein:
the optical device comprises a telescope; and
at least one of the optical device mounting feature and the image capture device mounting feature constrains adjustment of an orientation of the image capture device relative to the telescope by limiting relative rotation between the image capture device and the telescope such that angular displacement between the telescope and an image capture direction of the image capture device is limited to a maximum angular displacement of 25° or less.

* * * * *